Sept. 1, 1970  E. W. MOLLOY  3,526,577
METHOD AND APPARATUS FOR GAS MEASUREMENT
Filed Dec. 13, 1966
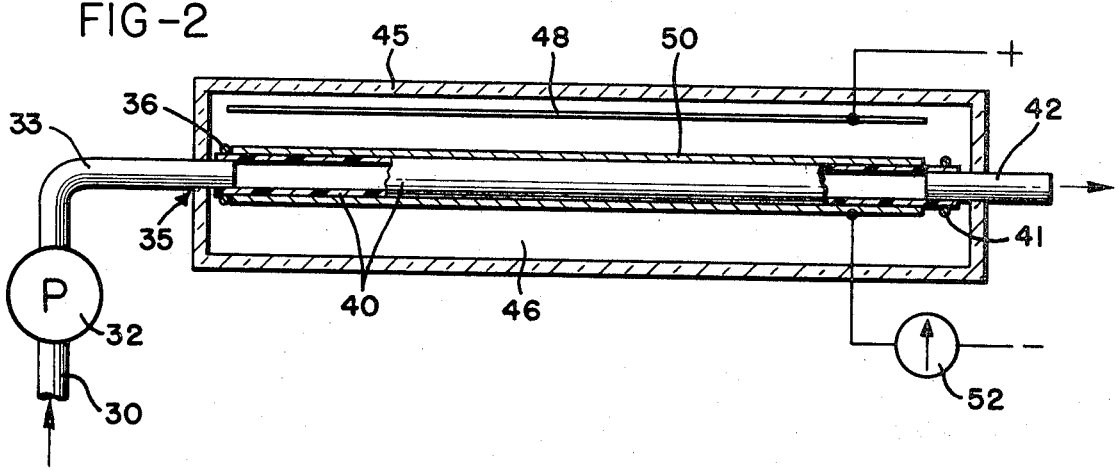
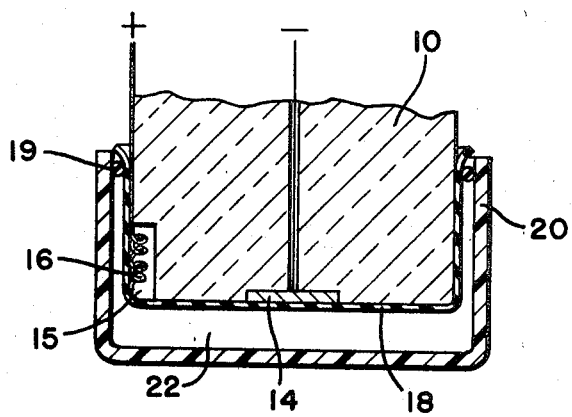
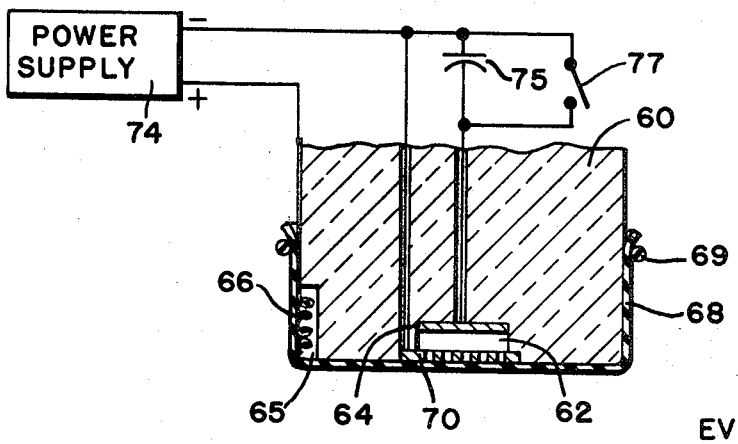
INVENTOR.
EVERETT W. MOLLOY
BY
Marechal, Biebel, French & Bugg
ATTORNEYS États-Unis Patent Office 3,526,577
Patented Sept. 1, 1970

3,526,577
METHOD AND APPARATUS FOR GAS MEASUREMENT
Everett W. Molloy, Yellow Springs, Ohio, assignor to The Yellow Springs Instrument Company, Inc., Yellow Springs, Ohio, a corporation of Ohio
Filed Dec. 13, 1966, Ser. No. 601,404
Int. Cl. G01n 17/46
U.S. Cl. 204—1      4 Claims

ABSTRACT OF THE DISCLOSURE

Use of a polarographic cell to measure gas concentration, wherein parameters such as membrane permeability and the mobility of the gas in its environment, both of which can vary with temperature, can be disregarded by operating with a sample of the gas containing environment which is a known quantity, and causing the cell to consume all of the gas from the sample, whereby it is possible to calculate the concentration of the gas per unit volume. The disclosure also describes novel polarographic cell devices for performing this method both continuously and repetitively.

BRIEF SUMMARY OF THE INVENTION

This invention relates to the method and to forms of apparatus for the measurement of a gas, particularly to determine the percent of a gas present in a gas mixture or in a liquid.

The purpose of the invention is to provide novel and simplified methods and apparatus for gas analysis, as for measuring the amount of oxygen present in a fluid (gas or liquid) atmosphere, and particularly to perform such measurements rapidly and repeatedly and with high sensitivity.

The invention is based in part upon the use of a polarographic cell, such as disclosed in U.S. Pat. No. 2,913,386, wherein a gas permeable membrane, permeable especially to the gas to be measured, forms a barrier between the fluid containing the gas and the electrodes and electrolyte of the cell. In a typical construction, a platinum cathode and a silver anode are immersed in a KCl solution which forms the electrolyte, and the chamber in which this electrolyte is contained has at least one wall formed of the membrane material. The gas to be measured, such as oxygen, can pass through the membrane and thus become present in the electrolyte, and when an electrical potential is applied across the anode and cathode, the gas under analysis will be consumed (as by reduction in the case of oxygen). The amount of electrical charge (current integrated as to time) required is directly related to the amount of this gas present in the electrolyte.

According to one form of the invention, the volume of a sample chamber is known precisely, and the polarographic cell is exposed to a sample. This chamber is filled with the fluid containing the gas to be measured. The cell is then operated and electrical current flowed through the electrolyte. The total amount of such current required to consume the gas completely is measured, as by integrating the current with respect to time. The amount of electric charge required during this operation bears a direct relation to the quantity of the gas which was present in the sample at the time that the cell was first exposed to the sample, therefore by knowing the volume of the sample chamber it is possible to calculate the concentration of the gas per unit volume.

For example, in the case of measuring oxygen concentration, if all oxygen has been consumed from the sample chamber, membrane, and electrolyte, and a new sample is introduced, the only oxygen present to the cell will be in the new sample. If the cell is activated, the oxygen must migrate from all parts of the sample, through the membrane, and into the electrolyte and be consumed at the cathode. The time required will vary depending in part on the permeability of the membrane and the mobility of the oxygen in the sample. These factors will change with temperature, but if the cell is activated for a time known to be sufficient to consume all the oxygen from the sample, regardless of changes in these factors due to temperature changes, then the system is independent of temperature.

According to another form of the invention, the sample of the fluid under test is provided as a predetermined rate of flow which passes through a special elongated polarographic cell device. Preferably, this cell has a tubular permeable membrane, through which this flow is directed. The area and permeability coefficient of this membrane, and area of the anode and cathode within the cell, are such that all oxygen (or other gas) from this sample flow can pass through the membrane and be reduced in the cell, therefore the fluid discharged from the cell is entirely depleted of oxygen. The amount of electrical current required is directly related to the amount of oxygen which is reduced in the cell, and knowing the flow rate, it is possible to calculate the amount of oxygen in the fluid under test.

Another feature of the invention is a unique polarographic cell construction which readily permits inhibiting a further passage of gas under analysis into a sample chamber within the electrolyte chamber. This structure includes a secondary cathode which is mounted immediately inside the membrane, and which will function to consume all gas passing through the membrane when an electrical potential is applied between the anode of the cell and this secondary cathode. Therefore, when the potential is applied to the secondary cathode, further flow of the gas under test into the chamber and past the secondary cathode to the primary cathode is effectively inhibited. The gas dissolved in the volume within the sample chamber (between the primary and secondary cathodes) is consumed at both cathodes. The partition of this dissolved gas will be constant for a particular arrangement of cathodes. Hence for a given unit an effective volume can be ascribed to the measuring cathode, and the current flowing through it can be integrated. This integrated current is related to the partial pressure of the gas in the electrolyte, and hence in the fluid under test.

The present invention, therefore, has for its principal object the provision of methods and apparatus for determining directly the amount or the partial pressure of a dissolved gas in a fluid under test, without need for compensation due to changes in temperature during the measurement; to provide novel polarographic cell structures which are particularly useful in measuring the total amount of a specific gas which is present in a fluid of unknown composition; and to provide novel methods and apparatus which provide a direct and true gravimetric reading of the total amount of a specific gas, particularly oxygen, present in a fluid of unknown composition.

Other objects and advantages of the invention will be apparent from the following description, the accompanying drawings and the appended claims.

In the drawings:

FIG. 1 is a view showing a conventional polarographic cell adapted for use in the novel methods provided by the invention;

FIG. 2 is a somewhat diagrammatic view of one novel form of polarographic cell provided by the invention; and FIG. 3 is a view similar to FIG. 1 showing another novel polarographic cell structure for use in performing the methods of the invention.

Referring to the drawings, which show preferred embodiments of the invention, FIG. 1 shows a generally known form of polarographic cell which can be employed to perform the novel "total consumption" method of the invention. The cell structure includes a glass or similar body 10 containing a gold cathode 14. To one side of the face of the body 10, there is a cavity 15 providing an enclosure for the anode 16, which may be a small coil of silver wire. The membrane 18 is fastened over the end of the cell by an elastic O-ring 19, thus defining an electrolyte chamber, including the cavity 15, which is filled with a suitable electrolyte, such as a KCl solution, which migrates into the region between the cathode and the membrane. The end of the cell structure can be closed by a suitable cap member 20, thus forming a sample chamber 22.

In using this apparatus, a sample of the fluid under test is placed in the chamber 22, substantially filling the chamber, and of a known volume. For example, a small measured amount of sample fluid can be placed in the cap 20, and the cap can then be placed on the end of the cell. The cell is then operated by connecting the anode and cathode to an electric power supply, as indicated, for a period of time sufficient to consume all of the dissolved gas in the sample in the case of oxygen, by reducing all of the dissolved gaseous oxygen in the sample. By integrating the electrical current required, it is possible to obtain an electrical measurement which corresponds to the total amount of the dissolved gas in the sample, and variations due to temperature, such as changes in the permeability of the membrane, can be ignored since the entire amount of dissolved gas is consumed. Variations of membrane permeability due to temperature, stressing, or aging do not influence the measurement. Changes in membrane permeability are manifested in a change in time required for measurement, and in a properly designed readout sufficient time can be allowed to insure accuracy. By knowing the total amount of oxygen present in this known sample, it is possible to calculate the total amount of oxygen present in a known, much larger, volume of the fluid to be tested.

FIG. 2 illustrates another form of the method and a novel polarographic cell. The sample of fluid under test is obtained by withdrawing a portion directly from the volume of fluid under analysis, into the intake pipe 30 to a pump 32, which is capable of producing a predetermined volume and rate of flow of the fluid. The outlet 33 of this pump is connected, to the inlet fitting 35 of the cell structure. Internally of the cell, and fastened around the fitting 35 by a suitable elastic O-ring 36, or equivalent, is a tubular gas permeable membrane 40 which is permeable to the gas which it is desired to meausre. Typically, a membrane permeable to oxygen can be used.

The other end of the membrane 40 is fastened by an elastic O-ring 41 to an outlet fitting 42, which can discharge to any suitable point. An outer housing 45 surrounds the membrane 40 and is connected at its opposite ends to the fittings 41 and 42, forming with the membrane 40 an electrolyte chamber 46 which is filled with a suitable electrolyte, such as a KCl solution. Within the electrolyte chamber there is an anode 48, which may be a small silver wire, or a length of silver strip, and a cathode 50 which is preferably a gold sleeve, or portion of a sleeve.

An electrical potential, for example in the order of 0.8 volt, is applied between the anode and cathode, and the current flowing through this electrochemical cell is measured by a means of an ammeter 52. By knowing the rate of flow of the test sample of fluid passing through the membrane 40, and by operating the cell such that all of the oxygen, or other dissolved gas for which the test is made, is completely consumed from the flow of the fluid sample passing through the cell, it is possible to calculate the amount of oxygen in a known much larger volume of fluid under test. In the case of oxygen, all of the oxygen gas passed through the permeable membrane 40 and is reduced by the electrochemical reaction of the cell. The amount of electrical current required to do this is directly related to the amount of gaseous oxygen being reduced.

FIG. 3 shows a novel form of polarographic cell which is temperature insensitive, in accordance with the invention, and which is capable of determining the partial pressure of a particular gas, such as oxygen, in a fluid under test. Here, the sample chamber is a portion of the electrolyte chamber of the cell. The test is performed by exposing the cell, while inactivated, to the fluid under test.

Referring specifically to FIG. 3, the novel cell structure includes a glass or similar body 60 provided with a central cavity 62 in which the primary cathode 64 is mounted. This cathode may conveniently be formed as a small plate or button of gold. To one side of the cavity 62 there is another cavity 65 in which there is a coil of silver wire, or equivalent, which provides the anode 66. The membrane 68 is fastened over the end of the cell by an elastic O-ring 69, or other suitable means, thus defining the electrolyte chamber which includes the two above-mentioned cavities. This chamber is filled with a suitable electrolyte such as a KCl solution. Directly behind the membrane 68, and overlying the cavity 62, there is a secondary cathode 70 which is in the form of a porous member of gold or other suitable material. This secondary cathode extends completely across the face of the cavity 62, such that any oxygen or other dissolved gas passing through the membrane 68 must enter the cavity 62 through the pores or openings of the secondary cathode, which may be considered as a guard or controlling electrode in the cell.

To operate this cell, it is exposed to the fluid under test, as mentioned above, for a sufficient time to allow the partial pressure of the dissolved gas to come to equilibrium, and at that time the cell is operated by applying a suitable potential difference, for example in the order of 0.8 volt to 1 volt, between the anode and each of the cathodes 64 and 70. The secondary cathode functions to prevent gas permeating the membrane 68 from entering the chamber 62 by consuming it before it can penetrate the pores of the secondary cathode. The power supply 74 may be of any suitable type to provide the desired D.C. voltage, and the primary cathode 64 can conveniently be connected to the negative side of the power supply through a capacitor 75, around which is connected a shorting switch 77.

When the cell is operated, the secondary cathode inhibits any further flow of dissolved gas into the chamber 62, and at the same time the dissolved gas in that chamber is depleted by the electrochemical reaction. It can be assumed, the exposed areas of the primary and secondary cathodes being known and other constants remaining equal, that a certain portion of the charge required to deplete all dissolved oxygen or other gas from the chamber 62 will result from current flow through the primary cathode 64, and the remainder will result from current flow through the secondary cathode. Initially the capacitor is discharged by closing switch 77, then this switch is opened at the beginning of a measurement. Once all of the dissolved gas is consumed from the chamber 62, the flow of current through the primary cathode will cease, hence the charge stored on the capacitor 75 will be the integrated current flow through the primary cathode. The amount of this charge can be measured by suitable conventional equipment (not shown) and will be directly related to the total dissolved gas depleted from the chamber 62 during operation of the cell. Any variation of membrane permeability due to change in temperature is of no effect on the operation, hence this factor need not be taken into consideration.

The present invention, therefore, provides methods of measuring the percentage of oxygen or other dissolved gas in a fluid, using an electrochemical or polarographic cell, and without need to correct for variations in the permeability of the cell membrane, as due to temperature changes, partial clogging or surface coating, or to correct for changes in the mobility of the dissolved gas. In the methods explained in connection with FIGS. 1 and 2, the charge required to consume the oxygen bears a direct relation to the total amount of oxygen available in the sample from which the oxygen or other gas is consumed. In the case of the method described in connection with FIG. 3, the integrated current is related to the partial pressure of the oxygen or other dissolved gas in the fluid under test, again without regard to variations in membrane permeability or mobility of the gas.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. The method of measuring the percentage of a dissolved gas such as oxygen in a fluid having an unknown content of such gas, comprising,
    (a) exposing a non-activated polarographic cell through a membrane selectively permeable to said gas to the fluid under test for a sufficient time to allow the partial pressure of dissolved gas in the electrolyte of the cell to stabilize with respect to the partial pressure of such gas in the fluid under test,
    (b) then activating the cell by passing a direct current through an anode and a cathode in said cell and simultaneously shielding the electrolyte in the cell from further exposure to the gas in the fluid by consuming any further gas as it passes through the said membrane,
    (c) operating the cell until electrical current ceases to flow between the anode and the cathode indicating depletion of all such gas in the electrolyte, and
    (d) measuring the total amount of electrical charge required to deplete all such gas in the electrolyte.

2. The method defined in claim 1, wherein said further gas is consumed by passing a direct current between said anode and a secondary cathode which is positioned between the primary cathode and the membrane.

3. In a polarographic cell, the combination of a primary cathode, means forming an electrolyte chamber of predetermined volume surrounding said primary cathode, an anode spaced from said primary cathode, a membrane which is selectively permeable to a gas to be measured covering said chamber, a secondary cathode mounted between said anode and said primary cathode, said secondary cathode being located at the entrance of said chamber in position to inhibit flow of dissolved gas into said chamber means connected to apply a difference in electrical potential between said anode and said secondary cathode, and means connected to apply a difference in electrical potential between said anode and said primary cathode independent of said secondary cathode.

4. A cell as defined in claim 3 including means for integrating the electrical current flow between said anode and said primary cathode when the electrical potential is applied.

References Cited

UNITED STATES PATENTS

| | | | |
|---|---|---|---|
| 3,196,100 | 7/1965 | Digby | 204—195 |
| 3,208,926 | 9/1965 | Eckfeldt | 204—195 |
| 3,227,643 | 1/1966 | Okun et al. | 204—195 |
| 3,260,656 | 7/1966 | Ross | 204—1.1 |
| 3,272,725 | 9/1966 | Garst | 204—195 |
| 3,328,277 | 6/1967 | Solomons et al. | 204—195 |
| 3,367,850 | 2/1968 | Johnson | 204—195 |
| 2,913,386 | 11/1959 | Clark | 204—195 |
| 3,454,485 | 7/1969 | Hauk et al. | 204—195 |

FOREIGN PATENTS 707,323  4/1954  Great Britain.

TA HSUNG TUNG, Primary Examiner

U. S. Cl. X.R.

204—195